UNITED STATES PATENT OFFICE.

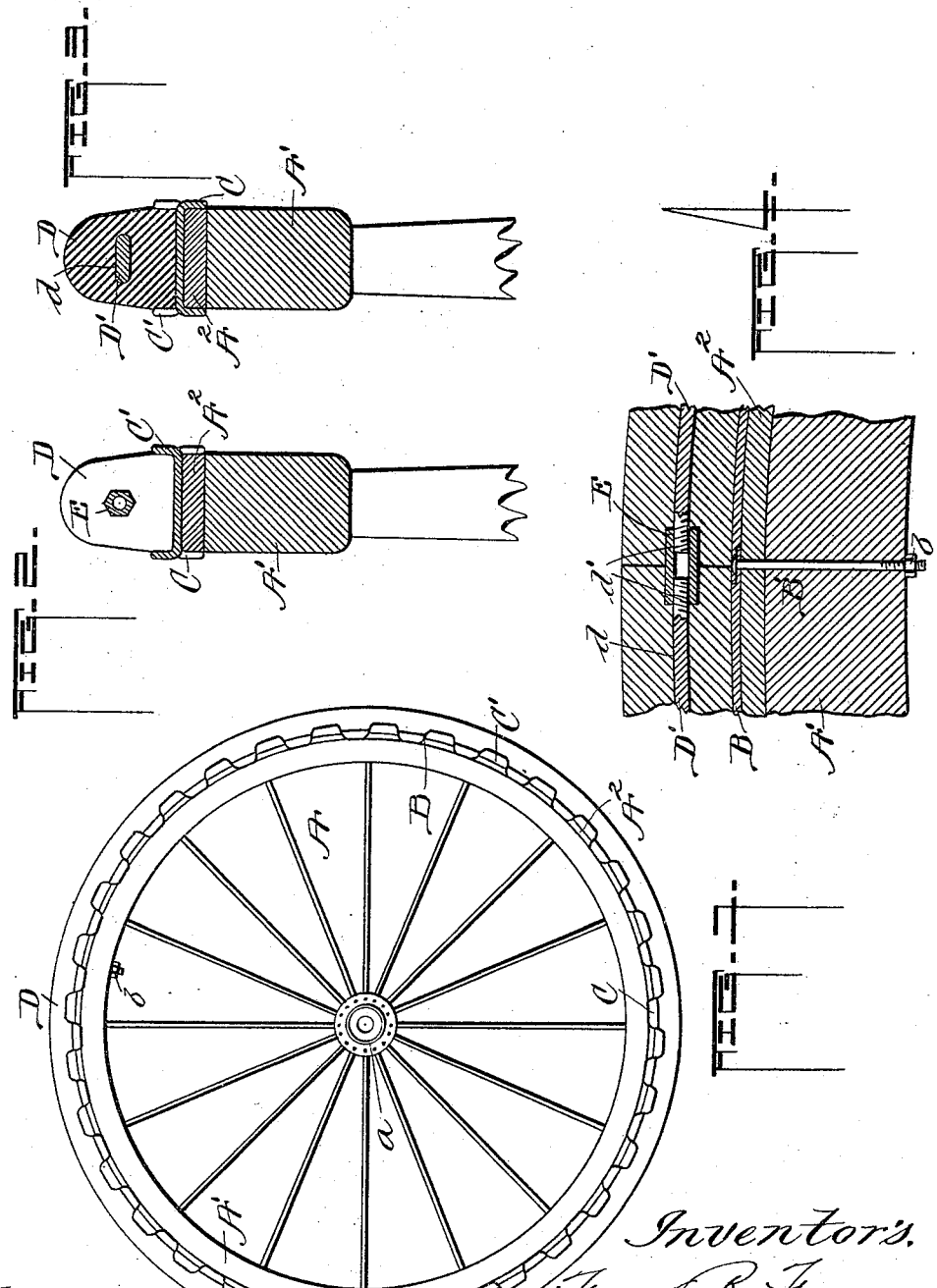

FRANK B. FAGAN AND EMIL P. STOEBLER, OF PEORIA, ILLINOIS.

CUSHION-TIRE FOR VEHICLE-WHEELS.

SPECIFICATION forming part of Letters Patent No. 616,833, dated December 27, 1898.

Application filed March 17, 1898. Serial No. 674,255. (No model.)

*To all whom it may concern:*

Be it known that we, FRANK B. FAGAN and EMIL P. STOEBLER, citizens of the United States, residing at Peoria, in the county of Peoria and State of Illinois, have invented certain new and useful Improvements in Adjustable Cushion-Tires for Vehicle-Wheels; and we do hereby declare that the following is a full, clear, and exact description of the invention, which will enable others skilled in the art to which it appertains to make and use the same.

Our invention relates to certain new and useful improvements in vehicle-wheels, by means of which a very simple and useful device is provided that is well adapted for the purpose designed.

More particularly our invention relates to a detachable cushioned tire for vehicle-wheels, whereby the ordinary vehicle-wheel has detachably connected to the outer periphery or the steel tire thereof a suitable frame-support, in which said frame a suitable cushioned tire is adapted to be placed and held in position by means provided on said frame and within said cushion-tire.

Our invention consists, essentially, of a frame having serrated sides which form lips projecting at right angles therefrom and which alternate around the edge of said frame on either side thereof, the lips projecting downward adapted to be clamped upon the steel tire of the wheel which are purposed to hold the same thereon. The lips that project upward are adapted to clamp the side of a cushion-tire that may be placed in the groove formed by said lips, and of means circumferentially arranged through the center of said cushion-tire adapted for clamping the tire firmly upon said frame, and of certain other details, which will hereinafter be more particularly pointed out in the specification and claims.

That our invention may be more fully understood, reference is had to the accompanying drawings, in which—

Figure 1 is an elevation of a vehicle-wheel, showing our improvement connected therein. Figs. 2 and 3 are cross-sections taken at different points across the felly of said wheel. Fig. 4 is a cross-section showing the manner of clamping the cushion-tire and also the manner of fastening the frame to the felly of said wheel.

In the drawings, A refers to a wheel which may be of the ordinary construction, having the hub $a$ and the rim or felly A', around which is secured the steel tire $A^2$.

B indicates a steel frame or rim carried around the periphery of the steel tire $A^2$, and which is suitably bolted thereon, as at B', which said bolt is carried through the felly, a nut $b$, secured thereon, holding the same in place. C C' are lips extending from said frame B, and alternate one up and one down around the entire distance thereof. The lips C, which extend downward, are adapted to clamp the sides of the steel tire $A^2$, adapting the same, in connection with the bolt B', to be securely held upon the said wheel, and by providing this means of connection the said frame B is easily placed on or removed from said wheel. The lips C', which extend upwardly, form a groove in said frame which is adapted to have placed therein a cushion-tire.

D is a cushion-tire detachably secured to the rim B, which said rim is, as above described, detachably secured to the rim of the vehicle-wheel.

D' is a strip of metal, or may be a strip made of any suitable material, which is carried circumferentially through the perforation $d$, which may be arranged centrally therein and through which the steel band may be inserted. The matching edges of the steel band are rounded and threaded, as shown at $d'$ $d'$, which are adapted to be held in position by the nut E.

In arranging the parts just described and adapting the same to any vehicle-wheel, whereby the wheel may be converted from a solid steel tire to a cushion-tire, the rim or band B is carried around the periphery of the steel tire and the downwardly-projecting lips C, the matching ends of the band adapted to be bolted together and to the wheel in the manner shown in Fig. 4. The cushion-tire D is then carried around the periphery of the band B and in the groove formed by the lips C', which are adapted to clamp the sides of the cushion-tire.

To clamp the cushion-tire firmly upon the rim or band B, the threaded ends of the steel band or clamp D' are brought together by means of the nut E, which may be adjusted as desired by spreading the ends of the cushion-tire, and inserting a small wrench between them and catching the nut will draw the ends of the steel band together, thus securing a complete locking device for the cushion-tire upon the rim.

The detachable parts, consisting of the band B and the tire D, may be easily removed from the wheel by releasing the nut E and the bolt B', which will convert the wheel from a cushion-tire to the ordinary steel-tire wheel.

Having thus fully described our invention, what we claim, and desire to secure by Letters Patent, is—

1. A rubber tire removably clamped to the periphery of a vehicle-wheel, of a flexible band having lips or projections projecting therefrom in opposite directions purposed for clamping the same to the tire of the wheel and for retaining the rubber tire within said flexible band, all substantially as and for the purpose set forth.

2. In a vehicle-wheel, a rim or band carried around the periphery of a wheel and removably clamped to the steel tire thereof, of laterally-extending lips or projections therefrom adapted to be clamped upon the steel tire in such a manner as to hold the same rigidly thereon, a cushion-tire carried within said band and having suitable mechanism carried within said tire for clamping the ends firmly together and of the means for retaining the tire in said band, all substantially as and for the purpose set forth.

3. In a vehicle-wheel a rubber tire in combination with a flexible rim both of which are removably clamped to said wheel, serrated edges forming lips projecting in opposite directions from said rim adapted to be clamped upon the felly or tire of said wheel for rigidly securing the rim thereto, the cushion-tire adapted to be held in said rim by the projections therefrom, a rod or strip of metal carried through the center of said tire and of the means for clamping the ends of said rod purposed for compressing the rubber tire and for holding the same rigidly in the flexible rim, all substantially as and for the purpose set forth.

4. In a detachable cushion-tire purposed to be attached to the periphery of a vehicle-wheel, the combination with the vehicle-wheel, of a rim or band suitably secured thereto, and having serrated edges forming lips which project at right angles therefrom in opposite directions and alternately around said rim, a cushioned tire detachably connected with said rim, and provided with a suitable clamp located centrally and circumferentially through said tire, adapted to clamp the same upon said band, all substantially as and for the purpose described.

5. In a detachable cushion-tire purposed to be attached to the periphery of a vehicle-wheel, the combination with a vehicle-wheel, of a rim or band having a series of lips projecting from said rim and alternately around the edge thereof, one series of lips adapted to clamp the band to the steel tire of said wheel, a cushion-tire detachably secured to said rim and held in place by means of the lips adapted to clamp the sides of said tire, of a suitable clamp carried within a perforation through said tire, and of means for tightening said clamp to secure the tire firmly on said band, all substantially as and for the purpose described.

6. In a vehicle-wheel a rubber tire in combination with a flexible band removably clamped to said wheel, lips from said band adapted to be clamped to the tire of said wheel and for retaining the rubber tire within said band, a steel band centrally disposed in the rubber tire and of the means substantially as shown for clamping the rubber tire firmly upon said wheel, all substantially as and for the purpose set forth.

7. The combination with a wheel-rim having a flat metal tire, a rubber tire removably clamped to said rim through an intermediate support for retaining said tire and which said support is removably clamped to the rim of the wheel, serrated clamping edges projecting in opposite directions from the flexible band adapted for clamping the same to the rim of the wheel and for holding the tire in said band and from lateral movement therein, a clamping device in said tire consisting of a rod or band and of the means for tightening said band for clamping the same rigidly to the flexible rim and wheel, all substantially as and for the purpose set forth.

In testimony whereof we affix our signatures in presence of two witnesses.

FRANK B. FAGAN.
EMIL P. STOEBLER.

Witnesses:
W. V. TEFFT,
CHAS. W. LA PORTE.